(12) United States Patent
Glad et al.

(10) Patent No.: US 11,644,933 B2
(45) Date of Patent: May 9, 2023

(54) PRESSURE SENSING ON A TOUCH SENSOR USING CAPACITANCE

(71) Applicant: Cirque Corporation, Sandy, UT (US)

(72) Inventors: Paul Glad, Sandy, UT (US); David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 16/985,421

(22) Filed: Aug. 5, 2020

(65) Prior Publication Data

US 2020/0379606 A1 Dec. 3, 2020

Related U.S. Application Data

(63) Continuation-in-part of application No. 15/473,426, filed on Mar. 29, 2017, now Pat. No. 10,761,622.

(51) Int. Cl.
| | | |
|---|---|---|
| *G06F 3/044* | (2006.01) | |
| *G06F 3/041* | (2006.01) | |
| *G06F 3/02* | (2006.01) | |
| *G06F 3/0354* | (2013.01) | |
| *G06F 3/03* | (2006.01) | |

(52) U.S. Cl.
CPC .............. *G06F 3/0446* (2019.05); *G06F 3/02* (2013.01); *G06F 3/0202* (2013.01); *G06F 3/03* (2013.01); *G06F 3/03547* (2013.01); *G06F 3/044* (2013.01); *G06F 3/0414* (2013.01); *G06F 3/04142* (2019.05); *G06F 2203/04105* (2013.01)

(58) Field of Classification Search
CPC . G06F 3/02; G06F 3/0202; G06F 3/03; G06F 3/03547; G06F 3/041; G06F 3/0414; G06F 3/04142; G06F 3/04144; G06F 3/0416; G06F 3/044; G06F 3/0446; G06F 2203/04105
USPC .......................................... 345/168, 173, 174
See application file for complete search history.

(56) References Cited

U.S. PATENT DOCUMENTS

| | | | | |
|---|---|---|---|---|
| 8,232,963 B2 * | 7/2012 | Orsley | ................. | H03K 17/975 345/157 |
| 8,552,936 B2 * | 10/2013 | Hente | ................. | H03K 17/962 345/76 |
| 9,552,118 B2 * | 1/2017 | Liao | ...................... | G06F 3/0446 |
| 10,510,499 B1 * | 12/2019 | Huang | ................. | H03K 17/965 |
| 2006/0113178 A1 * | 6/2006 | Soma | ................... | H03K 17/975 200/600 |
| 2007/0152974 A1 * | 7/2007 | Kim | ....................... | G06F 3/016 345/168 |
| 2009/0057124 A1 * | 3/2009 | Orsley | ................. | H01H 25/041 200/600 |
| 2011/0148812 A1 * | 6/2011 | Hente | ................... | H03K 17/962 345/174 |
| 2011/0241442 A1 * | 10/2011 | Mittleman | ........... | H03K 17/975 29/622 |
| 2013/0068038 A1 * | 3/2013 | Bolender | ................ | G01L 1/142 73/862.626 |

(Continued)

*Primary Examiner* — Jason M Mandeville

(57) ABSTRACT

A touch sensor may include a substrate, a drive electrode on the substrate, a sense electrode on the substrate, and a deformable snap member disposed over the drive electrode and the sense electrode. The deformable snap member may include a deflectable metal material. When the metal material flexes from a resting position, a change in capacitance between the drive electrode and the sense electrode may be detectable.

17 Claims, 13 Drawing Sheets

(56) References Cited

U.S. PATENT DOCUMENTS

| | | | |
|---|---|---|---|
| 2013/0126325 A1* | 5/2013 | Curtis | H03K 17/9622 |
| | | | 200/600 |
| 2013/0141342 A1* | 6/2013 | Bokma | G06F 3/041 |
| | | | 200/341 |
| 2014/0002358 A1* | 1/2014 | Bruwer | G05G 9/047 |
| | | | 345/158 |
| 2015/0242017 A1* | 8/2015 | Liao | G06F 3/0447 |
| | | | 345/174 |
| 2017/0364161 A1* | 12/2017 | Lee | G06F 3/0443 |

* cited by examiner

PRESSURE SENSING ON A TOUCH SENSOR USING CAPACITANCE

RELATED APPLICATIONS

This application is a continuation-in-part of U.S. patent application Ser. No. 15/473,426 filed on Mar. 29, 2017 and entitled "Pressure Sensing on a Touch Sensor Using Capacitance." U.S. patent application Ser. No. 15/473,426 is herein incorporated by reference for all that it discloses.

BACKGROUND

Description of Related Art: There are several constructions for capacitance sensitive touch sensors which may take advantage of a system and method for combining a secure PIN pad and a touch screen using a single touch controller. It is useful to examine the underlying technology of the touch sensors to better understand how any capacitance sensitive touchpad can take advantage of the principles described in the present disclosure.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

It should be understood that use of the term touch sensor" throughout this document may be used interchangeably with "proximity sensor", "touch and proximity sensor", "touch panel", "touchpad" and "touch screen".

SUMMARY

In a first embodiment, a system and method is used for measuring pressure by using two substrates that are separated by a distance, each substrate having at least one electrode, and wherein touch sensor capacitance circuitry coupled to electrodes on each of the substrates and transmitting an active or drive signal (hereinafter a "drive signal") may be used to detect a bending or deflection of at least one of the substrates by measuring a change in distance between the electrodes on the different substrates when pressure is applied to one of the substrates, and wherein a compressible substrate may be disposed between the two substrates.

These and other objects, features, advantages and alternative aspects of the principles described herein will become apparent to those skilled in the art from a consideration of the following detailed description taken in combination with the accompanying drawings.

In some embodiments, a touch sensor may include a substrate, a drive electrode on the substrate, a sense electrode on the substrate, and a deformable snap member disposed over the drive electrode and the sense electrode. The deformable snap member may include a deflectable metal material. When the metal material flexes from a resting position, a change in capacitance between the drive electrode and the sense electrode may be detectable.

The deflection may be measured with a sense controller.

A range of pressures applied to the snap done may be detectable.

The touch sensor may include a carrier attached to the underside of the substrate, an open cavity with at least one opening is defined by the carrier, where the deformable snap member is at least partially disposed within the open cavity such that an apex of the deformable snap member protrudes out of the opening.

The carrier may be an open frame.

The carrier may be made of an electrically insulating material.

The sense electrode may be disposed on an underside surface of the substrate.

The substrate may be part of a capacitive touch pad incorporated into a computing device where the capacitive touch pad may be incorporated into a user touch surface of the substrate opposite of the underside surface.

The deformable snap member may be secured to the substrate.

The deformable snap member may be part of a plurality of deformable snap members secured to the substrate.

Activation of the plurality of deformable snap members may enable collection of both pressure information and location information.

A touch pad may include a substrate, one or more deformable snap members secured to a surface of the substrate, a sense electrode on the surface of the substrate, and a sensing circuit to measure a capacitive measurement affected by a distance between the sense electrode on the substrate and one or more deformable snap members.

The touch pad may include a drive electrode and the sense electrode disposed underneath the one or more deformable snap members and when a finger applies pressure to the one or more deformable snap members, a metal material used in the one or more deformable snap member deflects from a rest position.

A degree of deflection of the one or more deformable snap members may be detectable allowing for a range of pressure applied to the one or more deformable snap member to be detectable.

A change in a capacitance between the drive electrode and the sense electrode may be used to detect the deflection.

The one or more deformable snap members may be disposed on the substrate such that the one or more deformable snap members enable collecting position information and pressure information when pressure is applied to the one or more deformable snap members.

The touch pad may include a grid of at least one drive electrode and at least one sense electrode that define a touch sensitive area of the touchpad, a portion of the drive electrode and a portion of the sense electrode are disposed underneath the deformable snap member, a capacitance value exists between the drive electrode and the sense electrode when the drive electrode is activated and the deformable snap member is in a rest position, and where the capacitance value changes when a metal material of the deformable snap member is deflected from the rest position.

A greater deflection of the metal material may result in a greater change in the capacitance value.

In some embodiments, a method of using a touch pad sensor may include receiving a first change in a capacitive measurement from a first sense electrode on a first side of a substrate, determining that the first change in the capacitive measurement corresponds to a user touch or a user proximity gesture, receiving a second change in a capacitive measurement from a second sense electrode on a second side of a substrate, and determining that the second change in the capacitive measurement corresponds to a force input.

The second change in the capacitive measurement may be caused by a deflection of a deformable snap member secured to an underside of the substrate.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION OF THE INVENTION

Figure 1:
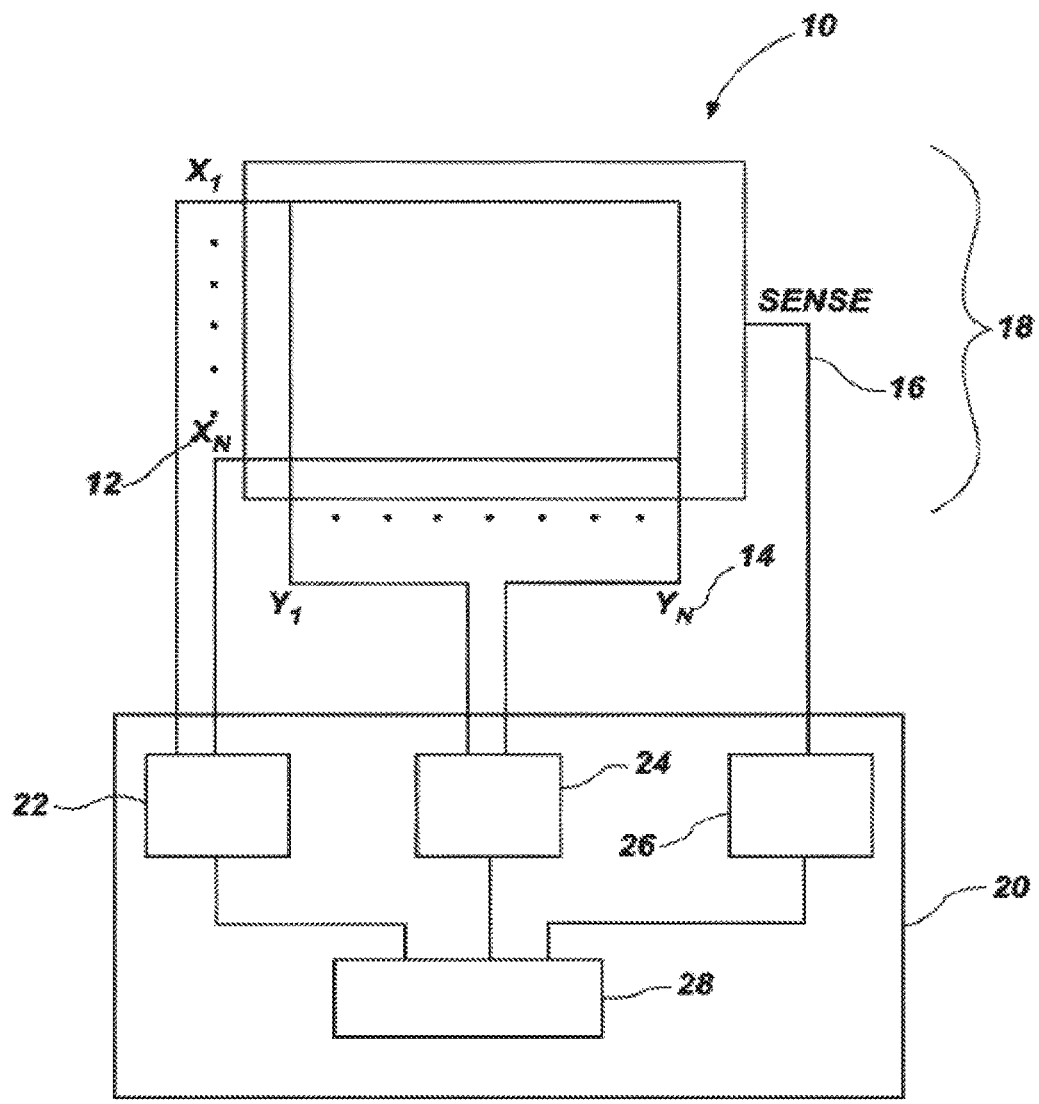
FIG. 1 depicts an example an operation of a touchpad that is found in the prior art, and which is adaptable for use according to the present disclosure.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, and the term "Rx" generally refers to a sense line.

For the purposes of this disclosure, the term "deformable snap member" generally refers to a snap member that is deformable under an applied force. The deformable snap member may be a snap dome, an oblong member, a triangular member, a square member, a hemi-spherical member, a shaped member, or combinations thereof. In some cases, the deformable snap member may include an outside convex surface and an inside concave surface that collective cause the thickness of the deformable snap member to bow outwardly.

For the purposes of this disclosure, the term "computing device" generally refers to electronic devices that include processors. Examples may include a laptop, a desktop, a flip phone, electronic tablet, other devices, or combinations thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "touchpad," and "touch screen." Further, for the purposes of this disclosure, the term "proximity controller" or "touch controller" is a logic device capable of receiving electrical measurements to determine changes in capacitance to determine whether an object is in proximity to a key position or another location. In some cases, the proximity controller may determine a distance the object is away from the key position or another location.

Figure 2:
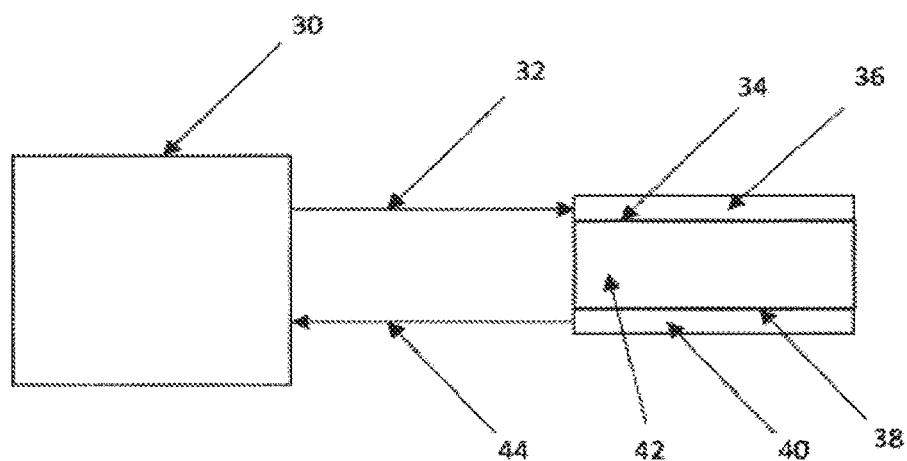
FIG. 2 depicts an example of a first embodiment according to the present disclosure.

In a first embodiment shown in a block diagram in FIG. 2, a touch controller 30 that may be used in a touch sensor provides a drive signal through a drive trace 32 to at least one drive electrode 34 disposed on a first substrate 36. A signal may be received by at least one sense electrode 38 disposed on a second substrate 40 that is separated from the one drive electrode 34 by a compressible material 42, and is transmitted by a sense trace 44 to the touch controller 30. The touch controller 30 may be capable of detecting a change in capacitance between the one drive electrode 34 and the one sense electrode 38.

One of the advantages of the first embodiment is that the drive signal that is transmitted by the touch controller 30 may be an active signal that operates at a specific frequency or a specific range of frequencies. An advantage over a static pressure sensing system may be that the active drive signal may be selected to be a frequency or frequencies that avoid noise that may otherwise interfere with the pressure sensing system.

For the purposes of this first embodiment, the principles of operation of the pressure sensing system of the first embodiment are the same whether there is one drive electrode or a plurality of drive electrodes, and one sense electrode or a plurality of sense electrodes. Accordingly, it may be assumed that there is at least one drive electrode, but possible more, and at least one sense electrode, but possibly more, and the results will be the same. Specifically, the first embodiment may detect a change in distance between the two substrates.

Figure 3A:
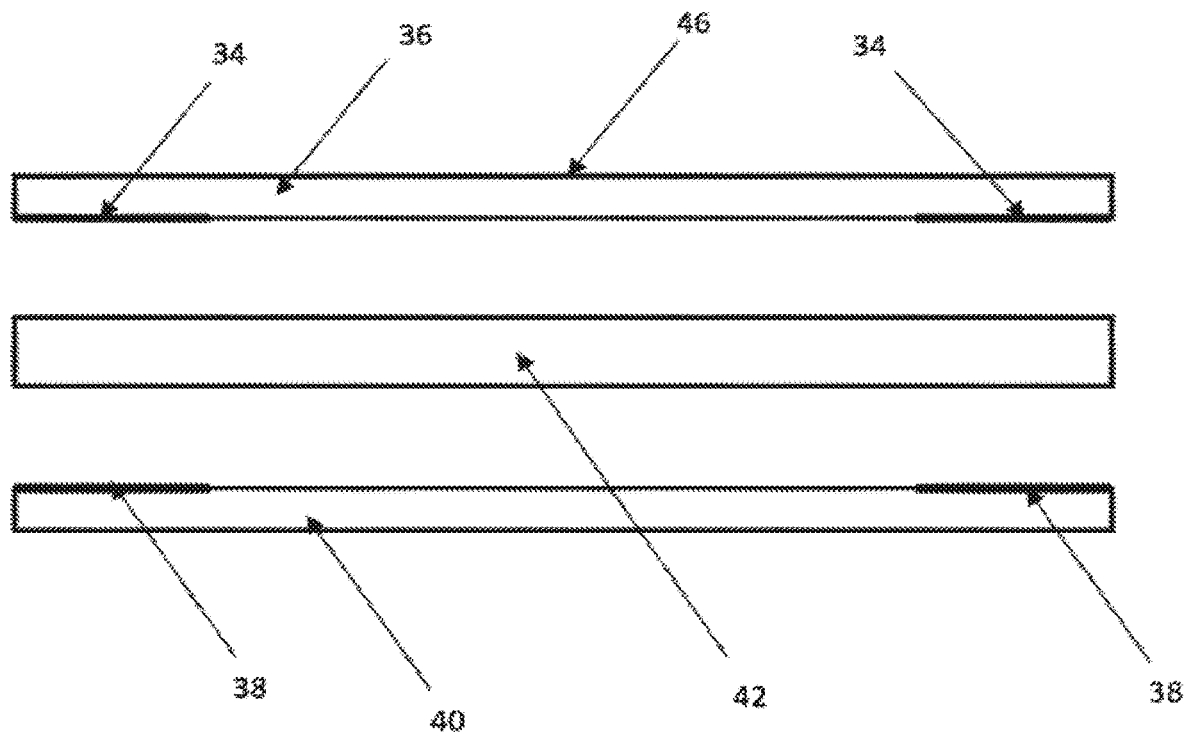
FIG. 3A depicts an example of substrates and electrodes of the first embodiment according to the present disclosure.

FIG. 3A shows an expanded view of the first embodiment. The first embodiment may include the first substrate 36 or top substrate which may function as a touch sensor 46 that is capable of detection and tracking of movements of a pointing object on a top surface thereof. The first substrate 36 may be a rigid or flexible material. Disposed on a bottom side of the touch sensor 46 is at least one electrode. The electrode may be a drive electrode 34 or a sense electrode 38.

The next or middle substrate may be a compressible material referred to as the compressible substrate 42. The bottom or second substrate 40, which may be a rigid or flexible material, is positioned such that the compressible substrate 42 is disposed between the first substrate 36 and the second substrate 40. The second substrate 40 may also include at least one electrode on a top surface. The electrode may be a drive electrode 34 or a sense electrode 38. The electrode on the first substrate 36 may perform a different function from the electrode on the second substrate 40. Thus, if the electrode on the first substrate 36 is a drive electrode 34, then the electrode on the second substrate 40 is a sense electrode 38, or vice versa.

The compressible substrate 42 may be compressed when a force is applied to a top surface of the first substrate 36. The force may compress the compressible substrate 42, and the change in distance between the first substrate 36 and the second substrate 40 may be detectable by the touch controller 30 (see FIG. 2) that is coupled to the electrode on the first substrate and the electrode on the second substrate, even if the compression of the compressible substrate is very small. In other words, the sensitivity of the touch controller 30 is very high, and may be capable of detecting very minute changes in the distance between the first substrate 36 and the second substrate 40 that may be caused by a finger or other pointing object making contact with and pressing on the surface of the first substrate.

For example, the touch controller 30 may be capable of detecting changes in the compressible substrate 42 that are not visible to the naked eye but which are detectable because of the high sensitivity of the touch controller.

The touch controller 30 may also be capable of detecting a specific range of pressure on the first substrate 36, and not just detect that a change has occurred. In other words, a user may touch the first substrate 36 and progressively apply more and more pressure, the change of which may be detectable because of the sensitivity of the touch controller 30.

In another aspect of the first embodiment, the electrodes 34, 38 may be disposed in various locations of the first substrate 36 and the second substrate 40. It may be desirable to dispose the electrodes 34, 38 directly opposite each other on the first and the second substrates 36, 40. For example, if the touch sensor 46 is a rectangle or square, the electrodes may be disposed in all the corners of the first and second substrates 36, 40. Placing the electrodes 34, 38 in the corners of a square or rectangular substrate provides assurance that pressure on any location of the first substrate will be detectable.

Alternatively, if the touch sensor 46 is in the shape of a circle or an ellipse, the electrodes 34, 38 may be disposed equidistantly around the edges so that any pressure applied at any location on the first substrate 36 may be detectable.

It should also be understood that the second substrate 40 may not need to be formed to have the same shape as the first substrate 36 or the compressible substrate 42. In other words, the second substrate may be a larger substrate of a size and shape that allows the first substrate 36 to compress the compressible substrate 42 when force is applied to the first substrate. The electrodes 34 on the first substrate 36 may be aligned with the electrodes 38 on the second substrate 38.

FIG. 3A shows some electrodes 34, 38 disposed on the first substrate 36 and the second substrate 40. The actual position of the electrodes 34, 38 and the thicknesses of the electrodes and the substrates 36, 40 is for illustration purposes only and should not be considered to be limiting of the concepts of the first embodiment.

Figure 3B:
FIG. 3B depicts an example of substrates and electrodes of the first embodiment according to the present disclosure.

FIG. 3B shows a non-expanded view of the electrodes 34, 36 and the substrates 36, 40 of the first embodiment. In an alternative embodiment, it may be possible to dispose the electrodes 34, 38 on opposite sides of the compressible substrate 42, while the first and second substrates 36, 40 only service as a surface on which to apply pressure against the compressible substrate.

Figure 4A:
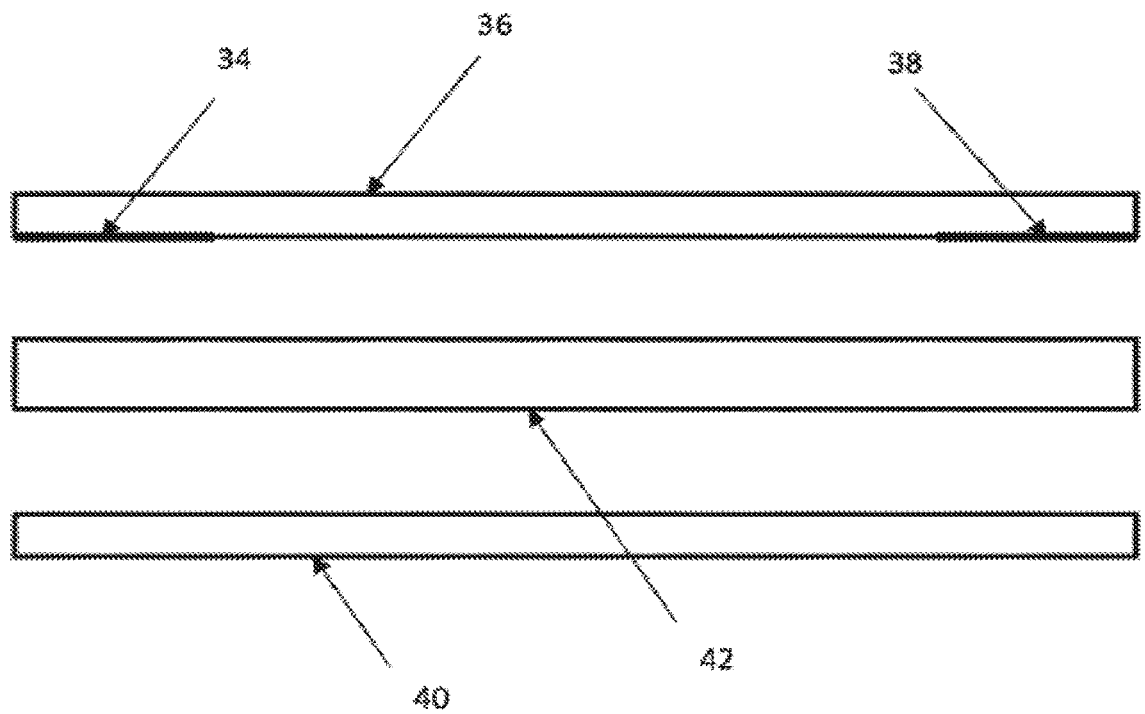
FIG. 4A depicts an example of substrates and electrodes of a second embodiment according to the present disclosure.
Figure 4B:
FIG. 4B depicts an example of substrates and electrodes of the second embodiment according to the present disclosure.

In a second embodiment shown in FIGS. 4A and 4B, a change is made to the location of the electrodes 34, 38 on the substrates 36, 40. Instead of the drive electrodes 34 being on one substrate and the sense electrodes 38 being on a different substrate, the drive and sense electrodes 34, 38 may be disposed on the same substrate. For example, assume that the drive 34 and sense 38 electrodes are disposed on the first substrate 36. The compressible substrate 42 may include the compressible material. However, the second substrate 40 may be tied to ground, tied to VDD, or it may be floating.

Pressure applied to the first substrate 36 which causes compression of the compressible substrate 42 may still be detectable by a touch controller 30 that is coupled to the drive 34 and sense 38 electrodes on the first substrate 36. A change in capacitance between the drive 34 and the sense 38 electrodes may be caused by the movement of the first substrate 36 as it gets closer to the second substrate 40 and changes the capacitance measured between the drive 34 and the sense electrodes 38 because of some coupling to the second substrate 40.

In the alternative, it should be understood that the drive and the sense electrodes may be disposed on the second substrate 40 and the first substrate 36 may be tied to ground, to VDD, or allowed to be electrically floating.

FIG. 4A shows that the electrodes 34, 38 may be on the first substrate 36 or the second substrate 40. The actual positions of the electrodes 34, 38 and the thicknesses of the substrates 36, 40 is for illustration purposes only and should not be considered to be limiting of the concepts of the embodiments.

Figure 5:
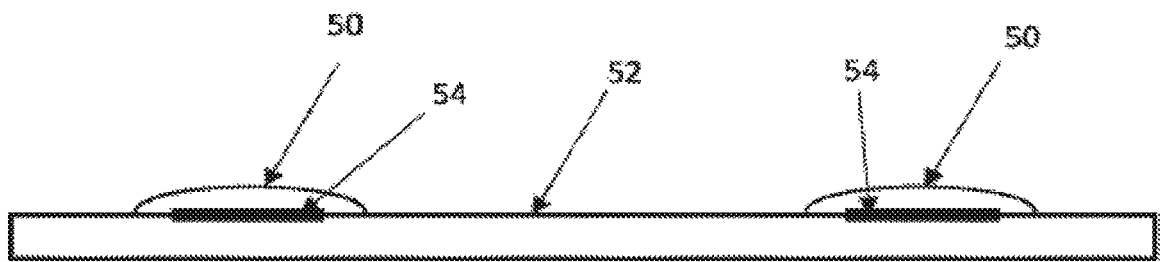
FIG. 5 depicts an example of a substrate, electrodes and deformable snap members of a third embodiment according to the present disclosure.

In a third embodiment shown in FIG. 5, a substrate 52 may have one or more deformable snap members 50 disposed on a surface thereof. Touch sensor elements 54 (drive and sense electrodes) may be disposed underneath the deformable snap members 50 such that when a finger presses on a deformable snap member, the metal material used in the deformable snap member flexes or deflects from a rest position. The deflection may be measured using a touch controller 30 that is coupled to the drive and sense electrodes 54. The degree of deflection of the deformable snap members 50 may be detectable, thereby allowing for a range of pressure applied to the deformable snap member to be detectable. Alternatively, the deformable snap members 50 are used in an activated/de-activated or on/off configuration, and it is only the change in capacitance that is needed, and not the actual capacitance.

Alternatively, a plurality of deformable snap members 50 may be disposed on a substrate 52 to thereby enable position information and pressure information to be collected from the plurality of deformable snap members.

Figure 6:
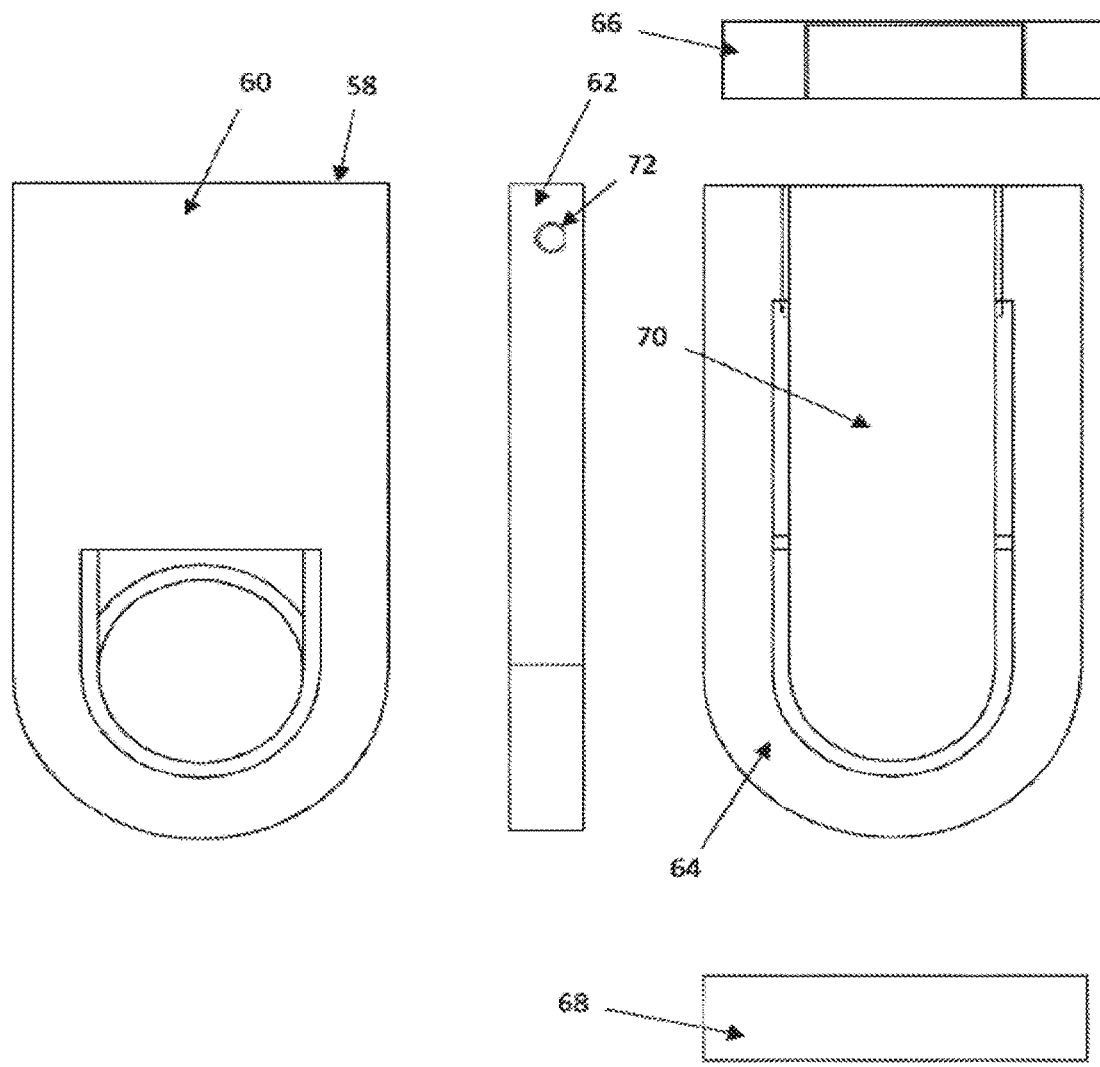
FIG. 6 depicts an example a force switch having a housing and a lever arm according to the present disclosure.

In a fourth embodiment, instead of a compressible substrate between a first and a second substrate, a lever of a force switch may be provided as shown in FIG. 6. FIG. 6 shows five views of a non-conductive housing 58 of a force switch that is provided to support a conductive lever arm 70. The five views include a bottom view 60, a side view 62, a top view 64, a back view 66, and a front view 68. Pressure may be applied to the conductive lever arm 70 which pivots on a pivot bar 72 shown in the side view 62, which moves the conductive lever arm closer to a target (not shown). The target may be disposed under the conductive lever arm 70 in the bottom of the housing 58 or under the bottom surface of the housing itself.

The conductive lever arm 70 and the target may each contain at least one electrode. A touch controller may determine a change in distance between the two electrodes (one a drive electrode 34 and one a sense electrode 38), and thereby determine the amount of pressure that is being applied to the conductive lever arm 70.

Figure 7:
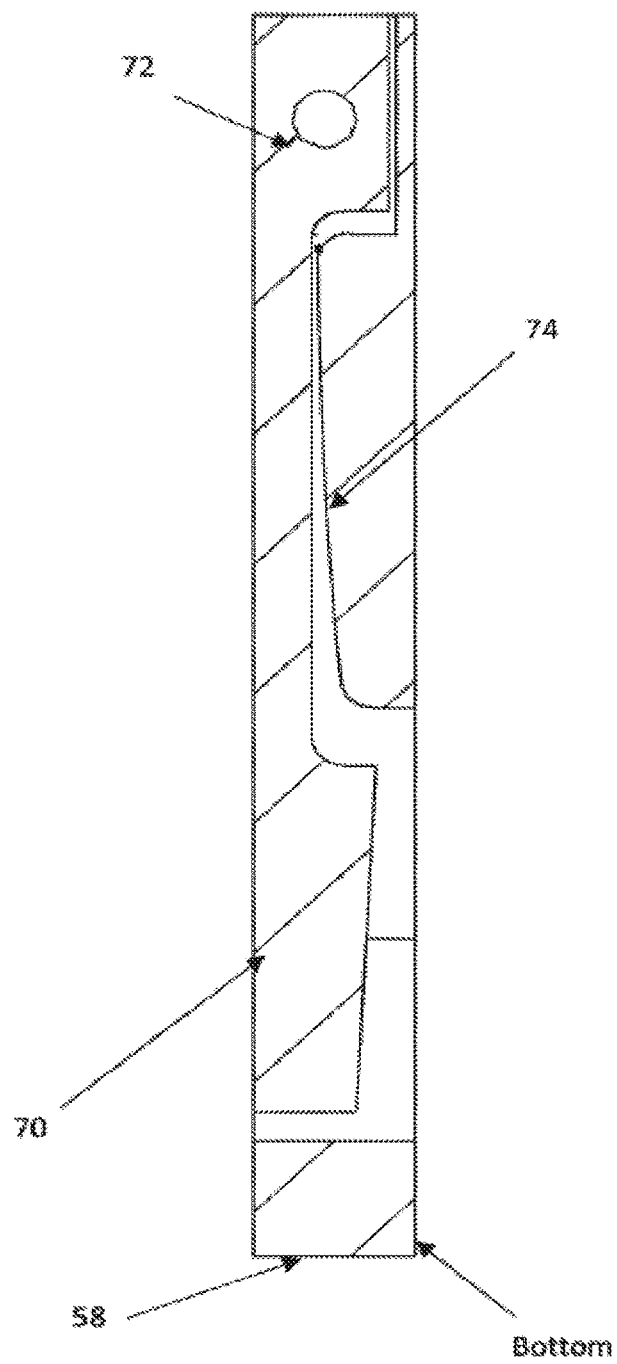
FIG. 7 depicts an example of housing and a lever arm showing that the lever arm is forced against a ramp under the lever arm that causes the lever arm to bend as a force is applied according to the present disclosure.

FIG. 7 is a cut-away side view of the force switch with the conductive lever arm 70, the pivot bar 72 and the housing. A ramp 74 within the housing 58 allows the conductive lever arm 70 to be bent along the ramp 74 so that there is a push back against the conductive lever arm.

The principles described herein include a method for sensing pressure using capacitance and a drive signal. This is accomplished by providing a touch controller that can determine a change in capacitance measured between at least two electrodes, a first substrate having at least one first electrode disposed thereon that is coupled to the touch controller, and a second substrate having at least one second electrode disposed thereon that is coupled to the touch controller. A compressible substrate may be disposed between the first substrate and the second substrate. The drive signal is applied to the first electrode at a desired frequency or frequencies that may enable the system to avoid noise that would otherwise interfere with a capacitance measurement.

When pressure is applied to the first substrate, a change in capacitance occurs between the first electrode and the second electrode caused by compression of the compressible substrate.

Figure 8:
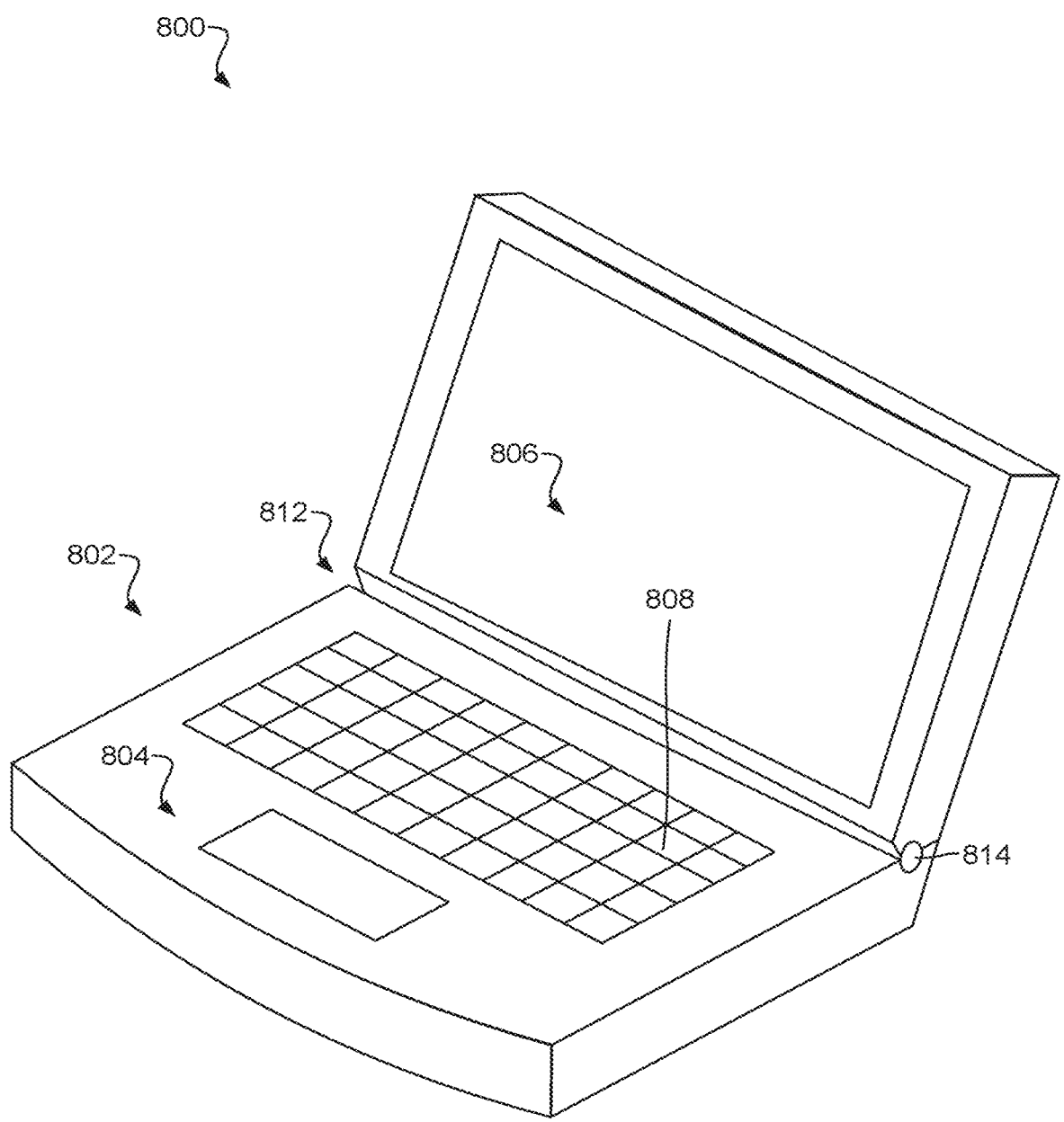
FIG. 8 depicts an example of a computing device according to the present disclosure.

FIG. 8 depicts an example of a computing device 800 that may incorporate a touch pad 804 according to the principles described in the present disclosure. In this example, the computing device is a laptop. In the illustrated example, the computing device 800 includes an input device, such as a keyboard 802 and the touch pad 804. The computing device 800 also includes a display 806. A program operated by the computing device 800 may be depicted in the display 806 and controlled by a sequence of instructions that are provided by the user through the keyboard 802 and/or through the touch pad 804.

The keyboard 802 includes an arrangement of keys 808 that can be individually selected when a user presses on a key with a sufficient force to cause the key 808 to be depressed towards a switch located underneath the keyboard 802. In response to selecting a key 808, a program may receive instructions on how to operate, such as a word processing program determining which types of words to process. A user may use the touch pad 804 to add different types of instructions to the programs operating on the computing device 800. For example, a cursor depicted in the display 806 may be controlled through the touch pad 804. A user may control the location of the cursor by sliding his or her hand along the surface of the touch pad 804. In some cases, the user may move the cursor to be located at or near an object in the computing device's display and give a command through the touch pad 804 to select that object. For example, the user may provide instructions to select the object by tapping the surface of the touch pad 804 one or more times.

The touch pad 804 may include a capacitance sensor disposed underneath a surface of the keyboard 802. In some examples, the touchpad 802 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touchpad 804. In some examples, the first set of electrodes and the second set of electrodes are equidistantly spaced with respect to each other. Thus, in these examples, the sensitivity of the touchpad 804 is the same in both directions.

In some cases, the display 806 is mechanically separate and movable with respect to the keyboard with a connection mechanism 814. In these examples, the display 806 and keyboard 802 may be connected and movable with respect to one another. The display 806 may be movable within a range of 0 degrees to 180 degrees with respect to the keyboard 802. In some examples, the display 806 may fold over onto the upper surface of the keyboard 802 when in a closed position, and the display 806 may be folded away from the keyboard 802 when the display 806 is in an operating position. In some examples, the display 806 may be orientable with respect to the keyboard 802 at an angle between 35 to 60 degrees when in use by the user. However, in these examples, the display 806 may be positionable at an angle desired by the user.

However, in other examples at least a portion of the display 806 is touch sensitive. In these examples, the touch sensitive display may include a capacitance sensor that is located behind an outside surface of the display 806. As a user's finger or other electrically conductive object approaches the touch sensitive screen, the capacitance sensor may detect a change in capacitance as an input from the user.

Figure 9:
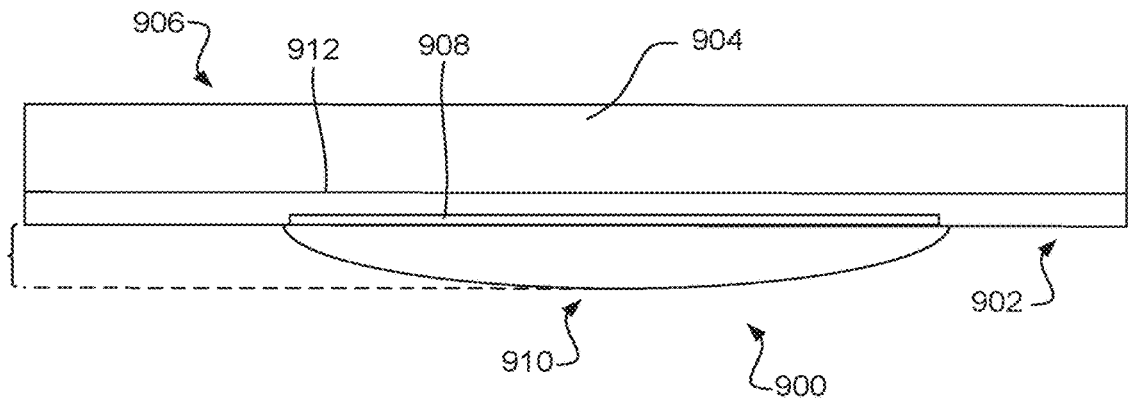
FIG. 9 depicts an example of an unflexed deformable snap member secured to a substrate according to the present disclosure.

FIG. 9 depicts an example of a deformable snap member 900 secured to the underside 902 of a substrate 904. The substrate 904 may be a printed circuit board or another type of substrate material. The substrate 904 may be incorporated into the touch pad of a computing device. For example, the substrate may be incorporated into a computing device depicted in FIG. 8 or into another type of laptop, portal device, phone, electronic tablet, digital device, or combinations thereof.

On a top side 906 of the substrate 904, at least one sense electrode may be deposited. These sense electrodes may be used to sense changes in capacitance resulting from a user touch or the proximity of a user's finger or a stylus.

In some cases, one or more sense electrodes may be incorporated into the underside 902 of the substrate 904 to form a sensor 908. The deformable snap member 900 may be positioned over the sensor 908 formed on the underside 902. The deformable snap member 900 may be made of an electrically conductive material, such as a metal. In other examples, an electrically conductive material may be deposited onto the deformable snap member, secured to the deformable snap member, affixed to the deformable snap member, or otherwise integrated into the deformable snap member.

Figure 10:
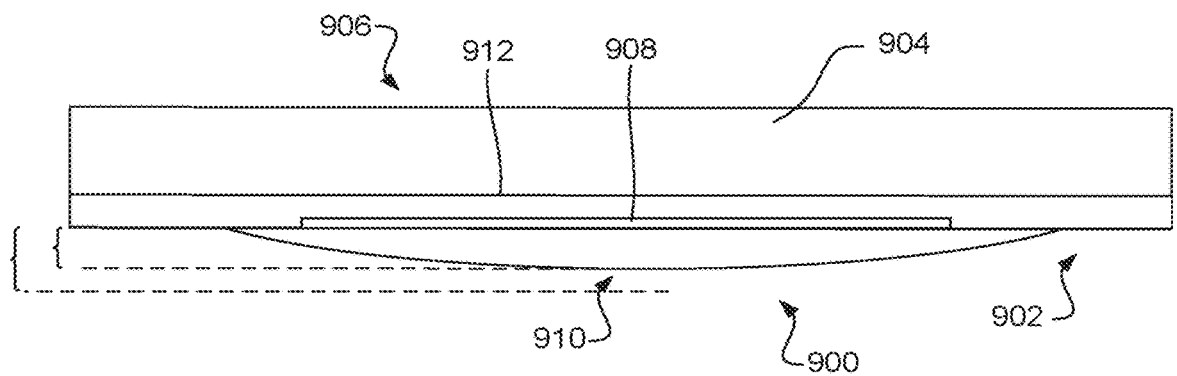
FIG. 10 depicts an example of a flexed deformable snap member secured to a substrate according to the present disclosure.

The substrate 904 may be movable with respect to the body of the computing device. A user may press on the touch pad with a force sufficient to move a portion of the touch pad downward into a cavity formed by the body of the computing device. As the portion of the touch pad moves deeper into the computing device, the underside 902 of the substrate 904 may be pushed against a floor or another structure within the computing device's cavity. In some cases, the deformable snap member 900 may come into contact with a structure causing the apex 910 of the deformable snap member 900 to be pushed back towards the sensor 908 on the underside 902 of the substrate 904. FIG. 10 illustrates the deformable snap member 900 being depressed as the result of the touch sensor being moved deeper into the computing device's cavity. As the apex 910 or other portions of the deformable snap member 900 come closer to the underside 902 and/or the sensor 908, the capacitance between the electrically conductive material of the deformable snap member 900 and the sense electrode changes. This change in capacitance can be measured with the sensor 908 and its associated hardware.

When the user releases the pressure on the touch pad, the touch pad may return to the original position within the computing device. As a result, the deformable snap member 900 may return to its original shape, and the sensor may sense the original capacitance values that were sensed before the user applied the force to the touch pad.

The capacitance measurement may be based, at least in part, on the distance between the electrically conductive material of or attached to the deformable snap member and the sensor on the underside of the substrate. As the pressure is applied to the top of the touch pad and the deformable snap member is pushed against a structure, the distance between the sensor and the electrically conductive material is reduced. This change in distance may cause a change in capacitance. The narrower the distance between the sensor and the electrically conductive material, the greater the change in capacitance may become. In some cases, the touch pad, deformable snap member, and the structure against which the deformable snap member is pushed against are spaced and positioned such that even when the touch pad is pressed as deep into the computing device's cavity as possible, the electrically conductive material of the deformable snap member does not make physical contact with the sensor. In other words, even when the touch pad is pressed into the maximum distance allowed by the physical constraints of the computing device's dimensions, there will still be a gap between the sensor and the electrically conductive material of the deformable snap member. This gap may prevent the deformable snap member from shorting to the sensor. The gap may also the allow the sensing circuit to continuously read the capacitance measurement unaffected by electrical shorting.

An electrically insulating layer 912 may be incorporated into the substrate 904 to shield the effects of the user's presence from the capacitance readings measured on the underside 902 of the substrate 904. Thus, the top side 906 of the substrate 904 may be used to measure parameters using capacitance readings that are undetected on the underside 902. Similarly, the underside 902 of the substrate 904 may be used to measure parameters using capacitance readings that are undetected on the top side 906. The top side 906 of the substrate 904 may be used to determine touch inputs and/or proximity inputs from the user while the underside 902 of the substrate 904 may be used to measure the force inputs from the user. Generally, when a user applies a pressure onto the touch pad, the top side 906 of the touch pad will detect how close the user's finger is from the sense electrodes deposited on the top side 906. However, as the user pressure more on the touch pad causing the touch pad to move downward, the distance between the user's finger and the sense electrode may not change due to the rigid structure of the touch pad. In this example, the capacitance readings from the touch pad may not be useful for determining the amount of force that is accompanied with the touch. Thus, the movement of the deformable snap member 900 on the underside 902 of the substrate 904 may provide an additional input of the amount of force accompanied with the touch.

In some cases, a range of pressure may be detected based on the amount of deflection experienced by the deformable snap member 900. For example, the user may press on the deformable snap member 900 with a force sufficient to slightly deflect the distal most portions of the deformable snap member. As a result, the change in the capacitance reading may change by a relatively small amount. However, if the user applies an additional amount of force, the touch pad may move deeper into the cavity resulting in a greater deflection of the deformable snap member 900. As a result, the change in capacitance may be even greater. Likewise, if the user applied even more force, the deflection of the deformable snap member 900 may be even greater resulting in an even greater change in capacitance.

The deformable snap member 900 may be secured to the underside 902 of the substrate 904 through any appropriate mechanism. In some examples, the deformable snap member 900 may be secured to the substrate 904 with an adhesive, tape, a bonding agent, a mechanical fixture, a carrier, another mechanism, or a combination thereof. In some cases, the deformable snap member 900 is secured to the underside 902 at a single location or at multiple locations.

Figure 11:
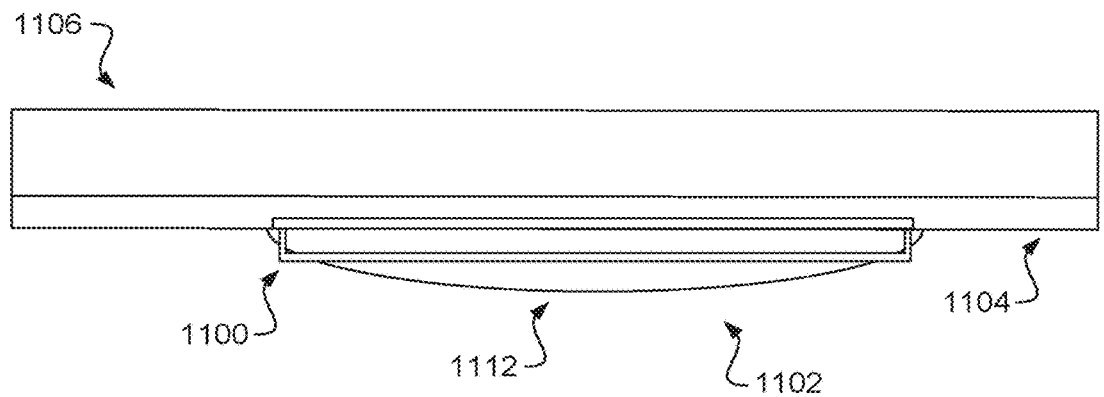
FIG. 11 depicts an example of a deformable snap member secured to a substrate with a carrier according to the present disclosure.
Figure 12:
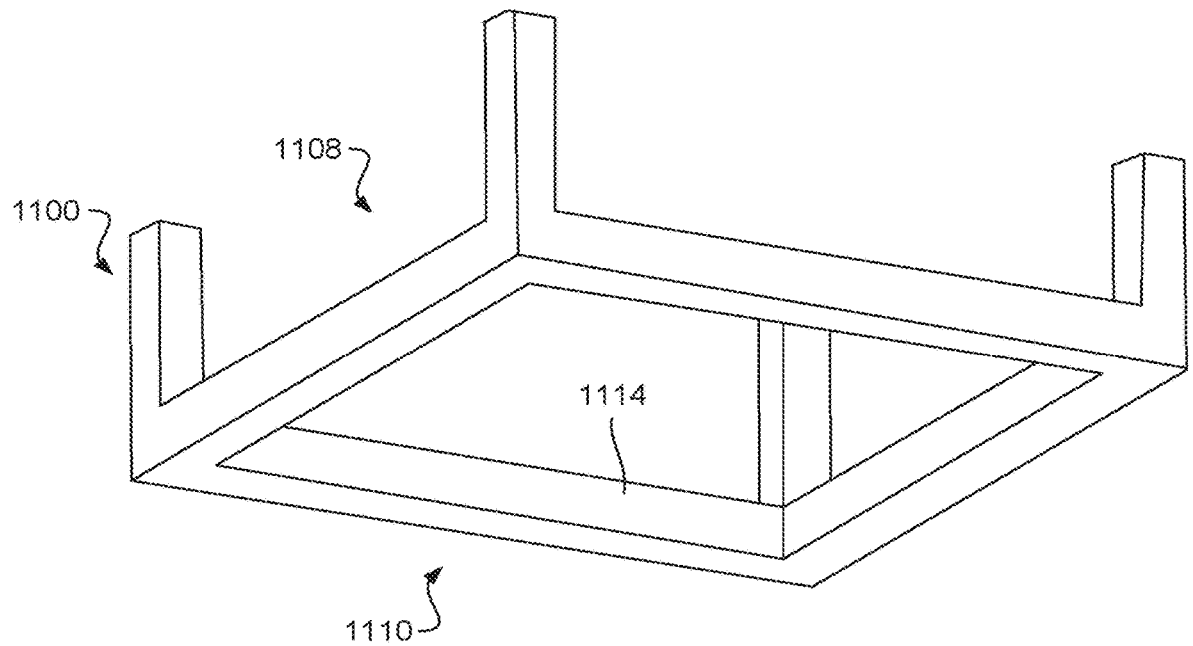
FIG. 12 depicts an example of a carrier according to the present disclosure.

FIG. 11 depicts an example of a carrier 1100 that secures the deformable snap member 1102 to the underside 1104 of the substrate 1106. An isolated view of the carrier is depicted in FIG. 12 for clarity. While these examples depict a particular structure, shape, size, and/or orientation of the carrier, any appropriate structures, shapes, sizes, and/or orientations of the carrier may be suitable with the principles described in the present disclosure.

In the illustrated example, the carrier 1100 may be an open frame that forms an internal cavity 1108 in which the deformable snap member can reside. The open frame may include at least one opening 1110 that allows the apex 1112 of the deformable snap member to protrude out of the opening and out of the internal cavity. The edges 1114 defining the opening to the carrier's open cavity may retain at least a portion of the deformable snap member within the open cavity while allowing the apex 1112 to protrude out of the opening.

The carrier 1110 may be made of any appropriate material. In some examples, the carrier 1110 is made of an electrically insulating material that has no effect or a minimal effect on the capacitance readings measured by the sensor on the underside 1104 of the substrate 1106. For example, the carrier 1110 may be made of a plastic material or another type of material that is electrically insulating.

The carrier 1110 may retain the deformable snap member against the underside 1104 without anchoring a portion of the deformable snap member to a specific location. As a result, when the deformable snap member is deflected, the body of the deformable snap member may be free to spread out and move across the surface of the underside 1104 to the limits constrained by the physical parameters of the carrier 1110.

Figure 13:
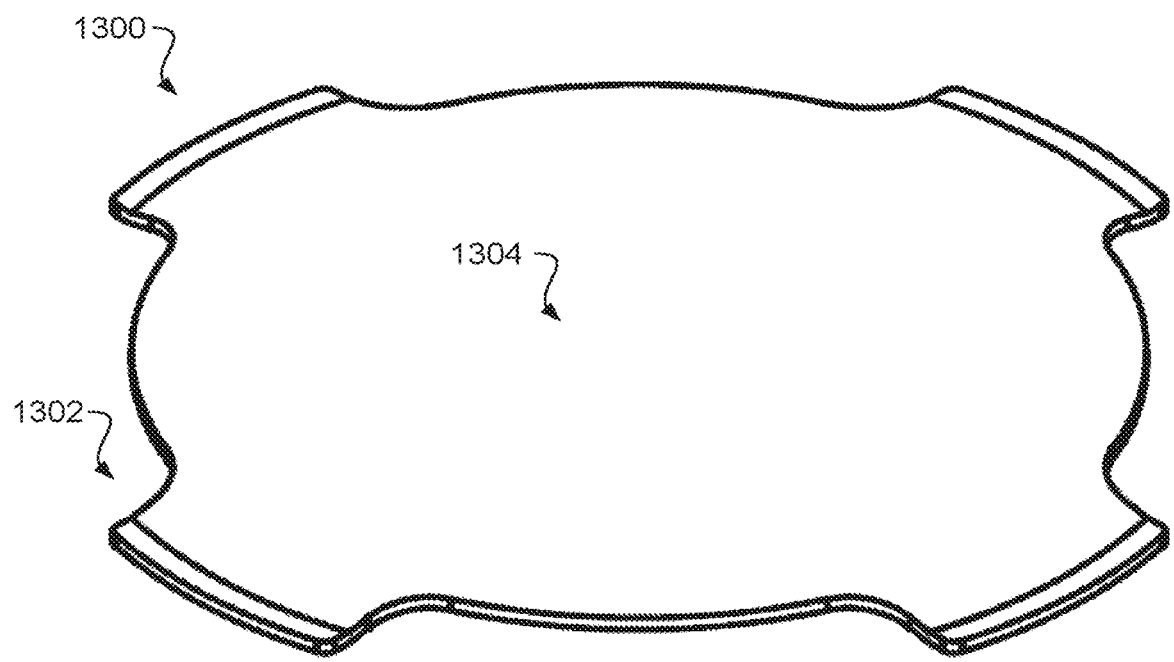
FIG. 13 depicts an example of a deformable snap member according to the present disclosure.
Figure 14:
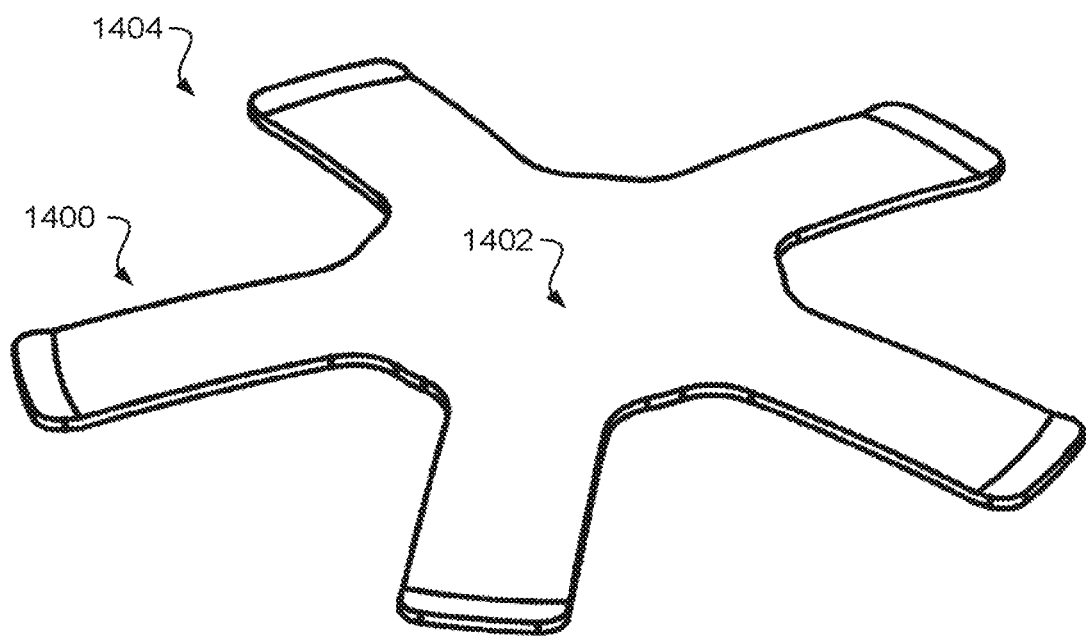
FIG. 14 depicts an example of a deformable snap member according to the present disclosure.
Figure 15:
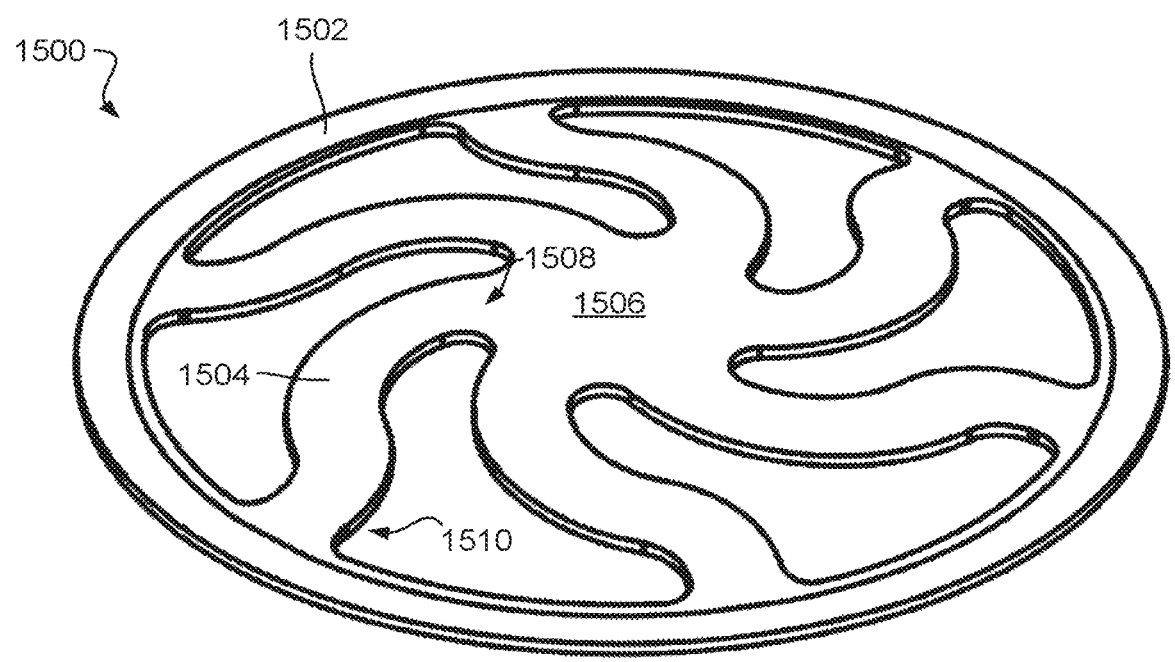
FIG. 15 depicts an example of a deformable snap member according to the present disclosure.
Figure 16:
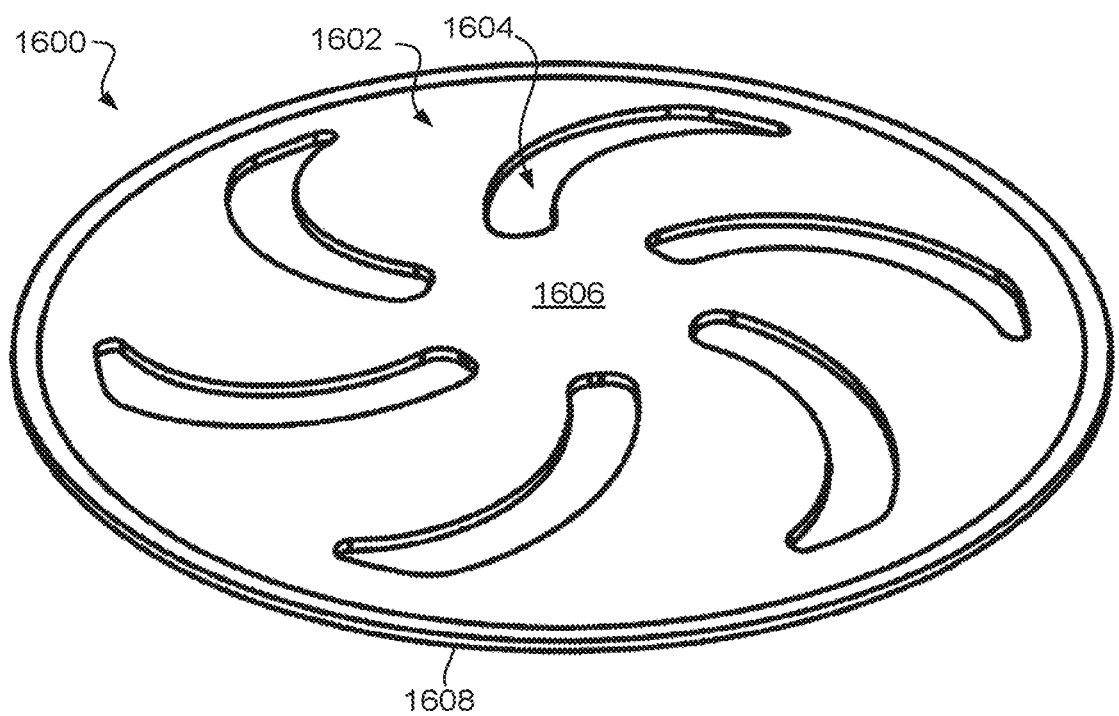
FIG. 16 depicts an example of a deformable snap member according to the present disclosure.

FIGS. 13-16 depict examples of deformable snap members that may be suitable with the principles described in the present disclosure. In the example of FIG. 13, the deformable snap member 1300 may include multiple tabs 1302 that protrude from a central body 1304. In the example of FIG. 14, multiple arms 1400 may protrude from a central body 1402 of the deformable snap member 1404. In the example of FIG. 15, the deformable snap member 1500 includes a circumferential base 1502 with spokes 1504 connecting the circumferential base 1502 to a central hub 1506. The spokes 1504 include a hub end 1508 and a base end 1510. Each of the hub ends 1508 and the base ends 1510 connect to their respective circumferential base 1504 and hub 1506 at angles. In this example, the resulting shape of the spokes 1504 is a wavy shape 1512. This construction imposes a torsional movement to the deformable snap member 1500 as the deformable snap member 1500 is deflected. In the example of FIG. 16, the deformable snap member 1600 includes body a 1602 with multiple cutouts 1604 diverging from a central area 1606 and spreading outward as the cutouts approach a circumference 1608 of the deformable snap member's body 1602. This deformable snap member construction may also cause a torsional load when the deformable snap member 1600 is being deflected.

Figure 17:
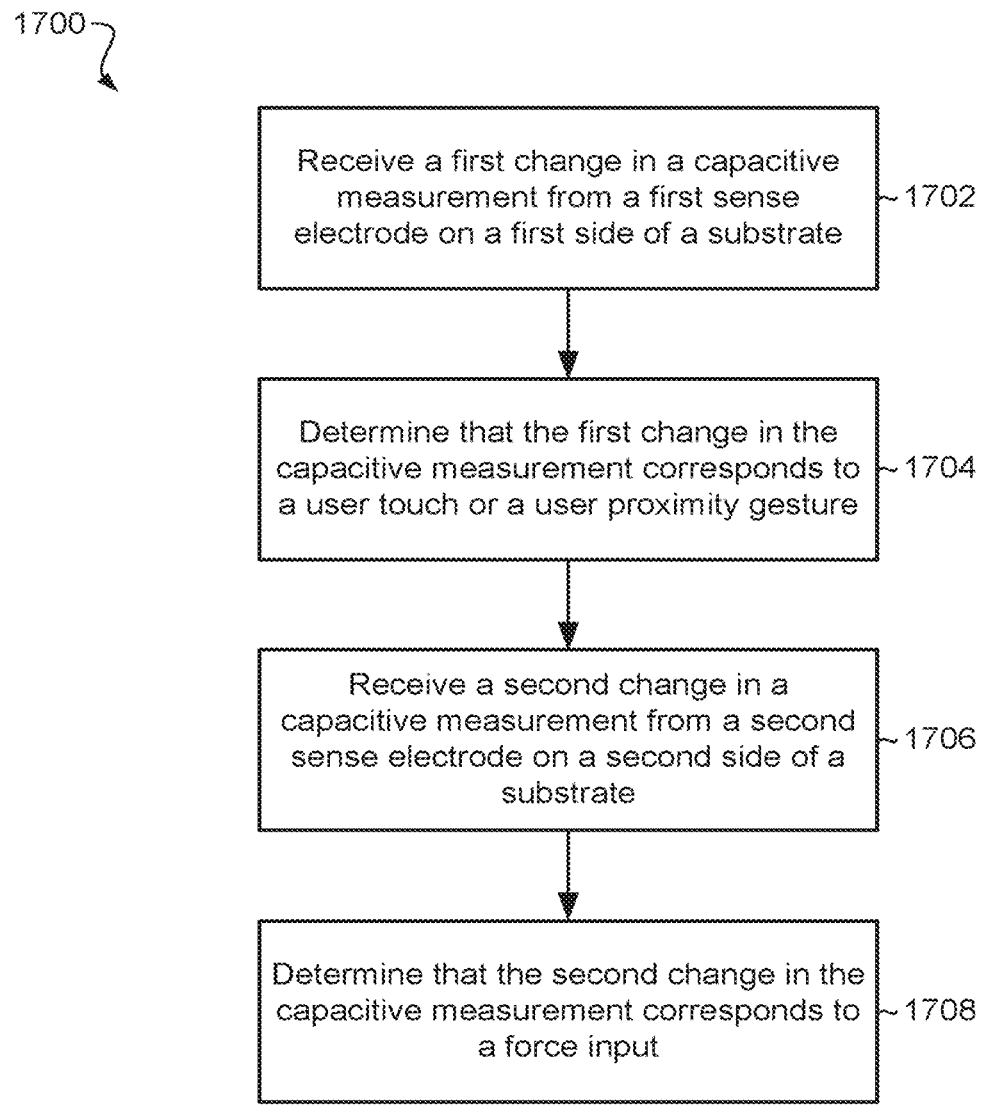
FIG. 17 depicts an example of a method of using a touch pad according to the present disclosure.

FIG. 17 depicts an example of a method 1700 of using a touch pad sensor according to the present disclosure. This method 1700 may be performed based on the description of the devices, module, and principles described in relation to FIGS. 1-16. In this example, the method 1700 includes receiving 1702 a first change in a capacitive measurement from a first sense electrode on a first side of a substrate, determining 1704 that the first change in the capacitive measurement corresponds to a user touch or a user proximity gesture, receiving 1706 a second change in a capacitive measurement from a second sense electrode on a second side of a substrate, and determining 1708 that the second change in the capacitive measurement corresponds to a force input.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify this disclosure. Also, a number of steps may be undertaken before, during, or after the above elements are considered. Accordingly, the above description should not be taken as limiting the scope of the principles described herein.

The invention claimed is:

1. A touch sensor, comprising:
a substrate;
a first drive electrode on a first side of the substrate;
a first sense electrode on the first side of the substrate;
wherein the first drive electrode and the first sense electrode form at least a portion of a capacitive touch sensor on the first side of the substrate; and
a second drive electrode on a second side of the substrate where the second side is opposite to the first side;
a second sense electrode secured to the second side of the substrate;
a deformable dome member disposed over the second drive electrode and the second sense electrode, the deformable dome member includes:
a deflectable metal material;
a carrier attached to the second side of the substrate;
an open cavity with at least one opening is defined by the carrier;
wherein when the metal material flexes from a resting position, a change in capacitance between the second drive electrode and the second sense electrode is measurable;
wherein an amount of deflection of deflectable metal material is measurable with a sense controller;
wherein the deformable dome member is at least partially disposed within the open cavity such that an apex of the deformable dome member protrudes out of the opening in a first direction and edges of defining the open cavity retain just a portion of the deformable dome member within the open cavity and at least a portion of the deformable dome member extends beyond the edges of the open cavity in a second direction where the first direction is transverse the second direction.

2. The touch sensor of claim 1, wherein a range of pressures applied to the deformable dome member is detectable.

3. The touch sensor of claim 1, wherein the carrier is an open frame.

4. The touch sensor of claim 1, wherein the carrier is made of an electrically insulating material.

5. The touch sensor of claim 1, wherein the substrate is part of a capacitive touch pad incorporated into a computing device; and
wherein the capacitive touch pad is incorporated into a user touch surface of the substrate opposite of an underside surface.

6. The touch sensor of claim 1, wherein the deformable dome member is secured to the substrate.

7. The touch sensor of claim 1, wherein the deformable dome member is part of a plurality of deformable dome members secured to the substrate.

8. The touch sensor of claim 7, wherein activation of the plurality of deformable dome members enable collection of both pressure information and location information.

9. The touch sensor of claim 1, further including an electrically insulating layer incorporated into the substrate that shields the effects of a user's presence from capacitance readings measured on a second surface of the substrate.

10. A touch pad, comprising:
a substrate;
a capacitance sensor disposed on a first surface of the substrate;
one or more deformable dome members secured to a second surface of the substrate where the second surface is opposite to the first surface;

a sense electrode secured to the second surface of the substrate; and a sensing circuit to measure a capacitive measurement affected by a distance between the sense electrode secured to the second surface of the substrate and the one or more deformable dome members;

a carrier attached to the second surface of the substrate;

an open cavity with at least one opening is defined by the carrier;

wherein an amount of deflection of deformable dome members is measurable with a sense controller wherein the one or more deformable dome members is at least partially disposed within the open cavity such that an apex of the one or more deformable dome member protrudes out of the opening in a first direction and edges of defining the open cavity retain just a portion of the one or more deformable dome members within the open cavity and at least a portion of the one or more deformable dome members extends beyond the edges of the open cavity in a second direction where the first direction is transverse the second direction.

11. The touch pad of claim 10, further comprising:
a drive electrode and the sense electrode disposed to cover the one or more deformable dome members;
wherein when a finger applies pressure to the one or more deformable members by pressing on the touch pad, a metal material used in the one or more deformable dome member deflects from a rest position.

12. The touch pad of claim 11, wherein a degree of deflection of the one or more deformable dome members are detectable allowing for a range of pressure applied to the one or more deformable dome member to be detectable.

13. The touch pad of claim 11, wherein a change in a capacitance between the drive electrode and the sense electrode is used to detect the deflection.

14. The touch pad of claim 13, wherein the one or more deformable dome members are disposed on the substrate such that the one or more deformable dome members enable collecting position information and pressure information when pressure is applied to the one or more deformable dome members.

15. The touch pad of claim 13, comprising:
a portion of the at least one drive electrode and a portion of the at least one sense electrode are disposed underneath the deformable dome member;
a capacitance value exists between the at least one drive electrode and the at least one sense electrode when the at least one drive electrode is activated and the deformable dome member is in a rest position;
wherein the capacitance value changes when a metal material of the deformable dome member is deflected from the rest position.

16. The touchpad of claim 15, wherein a greater deflection of the metal material results in a greater change in the capacitance value.

17. The touch pad of claim 10, wherein the touch pad is positioned within a cavity of a computing device;
wherein when the touch pad is pushed with a force sufficient to move a portion of the touch pad into a cavity, the portion of the touch pad moves deeper into the cavity until the one or more deformable dome member is pushed against a structure within the cavity causing an apex of the one or more deformable dome member to be pushed towards the sense electrode.

* * * * *